(12) United States Patent
Venugopalan et al.

(10) Patent No.: US 11,089,106 B2
(45) Date of Patent: Aug. 10, 2021

(54) AIRCRAFT MONITORING SYSTEM AND METHOD OF COLLECTING DATA IN AN AIRCRAFT

(71) Applicant: GE AVIATION SYSTEMS LLC, Grand Rapids, MI (US)

(72) Inventors: Vigneshwaran Venugopalan, Bangalore (IN); Avichandra Yallapalli, Bangalore (IN)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 46 days.

(21) Appl. No.: 16/212,118

(22) Filed: Dec. 6, 2018

(65) Prior Publication Data

US 2020/0186603 A1 Jun. 11, 2020

(51) Int. Cl.
*H04L 29/08* (2006.01)
*H04W 4/80* (2018.01)
*H04W 84/18* (2009.01)

(52) U.S. Cl.
CPC ............... *H04L 67/12* (2013.01); *H04W 4/80* (2018.02); *H04W 84/18* (2013.01)

(58) Field of Classification Search
CPC .......... H04L 67/12; H04W 4/80; H04W 84/18
See application file for complete search history.

(56) References Cited

U.S. PATENT DOCUMENTS

| 7,586,888 | B2 | 9/2009 | Wang |
| 7,801,058 | B2 | 9/2010 | Wang |
| 8,022,843 | B2 | 9/2011 | Mitchell et al. |
| 8,344,912 | B2 | 1/2013 | Mitchell et al. |
| 8,934,893 | B2 | 1/2015 | Lauer |
| 9,766,621 | B2 | 9/2017 | Glatfelter |
| 9,978,011 | B2 | 5/2018 | Jouper |
| 2010/0063650 | A1 | 3/2010 | Vian et al. |
| 2010/0073197 | A1 | 3/2010 | Eagleton et al. |
| 2011/0199976 | A1 | 8/2011 | Mitchell et al. |
| 2014/0136589 | A1* | 5/2014 | Wahler ............... H04L 63/0263 709/201 |
| 2017/0144773 | A1* | 5/2017 | Raman .................. B64D 45/00 |
| 2017/0199520 | A1* | 7/2017 | Glatfelter ............ G05D 1/0094 |
| 2017/0346623 | A1 | 11/2017 | Bill et al. |
| 2018/0162549 | A1 | 6/2018 | Ziarno |
| 2018/0338003 | A1 | 11/2018 | Carlson et al. |
| 2019/0297462 | A1* | 9/2019 | Aljadeff ................ H04W 4/029 |

FOREIGN PATENT DOCUMENTS

| CN | 106535103 A | 3/2017 |
| CN | 206004706 U | 3/2017 |

OTHER PUBLICATIONS

European Patent Office, Extended Search Report re Corresponding Application No. 192104000.2-1009, dated Apr. 24, 2020, 8 pages, Munich, Germany.

\* cited by examiner

*Primary Examiner* — James J Yang
(74) *Attorney, Agent, or Firm* — McGarry Bair PC (57) ABSTRACT

An aircraft system that includes an aircraft and a detector assembly. The aircraft can include at least one data system coupled to at least one component. The at least one data system or the at least one component can communicate an output via a wireless network. Output information is collected and communicated to the detector assembly. The detector assembly can include a receiver and at least one of a memory, a controller, or a communication link.

24 Claims, 5 Drawing Sheets

AIRCRAFT MONITORING SYSTEM AND METHOD OF COLLECTING DATA IN AN AIRCRAFT

BACKGROUND

In contemporary aircraft, monitoring aircraft components is required for aircraft operation and maintenance. Visual inspection and manual scanning of components, displays, or outputs of the aircraft are traditionally the methods used to obtain data regarding the aircraft components. If any anomalies are detected, then the components or systems are fixed or replaced, which results in a lengthy and expensive upkeep process.

BRIEF DESCRIPTION

In one aspect, the present disclosure relates to an aircraft system that includes an aircraft and a detector assembly. The aircraft includes at least one data system located within the aircraft and configured to aid in operation of the aircraft, at least one component operably coupled with the at least one data system and providing an output related thereto, and a wireless network including a plurality of wireless remote nodes located within the aircraft and operably coupled to the component to receive the output therefrom the plurality of wireless remote nodes communicatively coupled to each other, and at least one of the plurality of wireless remote nodes defining a wireless central node defining a wireless access point located in the aircraft and defining boundaries of the wireless network and wherein the wireless central node is configured to transmit collected data therein. The detector assembly includes a receiver configured for at least one-way communication of the collected data from the wireless central node on the aircraft and at least one of a memory, a controller, or a communication link operably coupled to the receiver, wherein when the detector assembly is within the boundaries, the collected data transmitted from the wireless central node is received by the receiver and at least one of stored in the memory, processed via the controller, or relayed via the communication link.

In another aspect, the present disclosure relates to a method of collecting information from a wireless central node in the aircraft having at least one data system configured to aid in operation of the aircraft with at least one component operably coupled and providing an output related thereto wherein the at least one component is wirelessly communicatively coupled to a wireless network including the wireless central node and a plurality of wireless remote nodes located within the aircraft to define collected data and at least one of storing the collected data, processing the collected data relaying the collected data, or transmitting the collected data.

In yet another aspect, the present disclosure relates to an aircraft that includes at least one data system associated with the aircraft and configured to aid in operation of the aircraft, at least one component operably coupled with the at least one data system and providing an output related thereto, and a Bluetooth network including a plurality of Bluetooth low energy mesh networking nodes located within a portion of the aircraft and operably coupled to the at least one component to receive the output therefrom, and a wireless central node operably coupled to the plurality of Bluetooth low energy mesh networking nodes and communicatively coupled thereto and defining a Bluetooth access point located in the aircraft and defining boundaries of the Bluetooth network and wherein the wireless central node is configured to transmit data therein.

DETAILED DESCRIPTION

Contemporary aircraft include systems that typically need to exchange data between the systems on the aircraft and operators located on the ground for maintenance, operational, and other purposes. WiFi and datalink services are currently used to exchange such data. These services are useful in that they provide for communication over a relatively great distance, from an airport-wide perspective. However, this benefit is also a detriment in that the communications may be more easily intercepted, which may not always be desirable, regardless of whether the data is encrypted or not. Moreover, these communication services require relatively-heavy, dedicated hardware be installed on the aircraft. As both WiFi and datalink services require equipment and/or antennas to be located in the aircraft these services lead to additional weight and an increase in the cost of operation.

Aspects of the present disclosure speak to an aircraft system and a method of collecting data from an aircraft. The aircraft system can include an aircraft and a detector assembly, where, by way of non-limiting example, the detector is located outside of the aircraft. The aircraft can include at least one data system coupled to at least one component. The at least one data system or the at least one component can communicate an output via a wireless network. Output from the at least one data system or the at least one component is collected at or communicated to a wireless central node. The wireless central node can then communicate with the detector assembly when the detector assembly is within a predetermined distance.

As used herein, "a set" can include any number of the respectively described elements, including only one element. All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order, and relative sizes reflected in the drawings attached hereto can vary.

Figure 1:
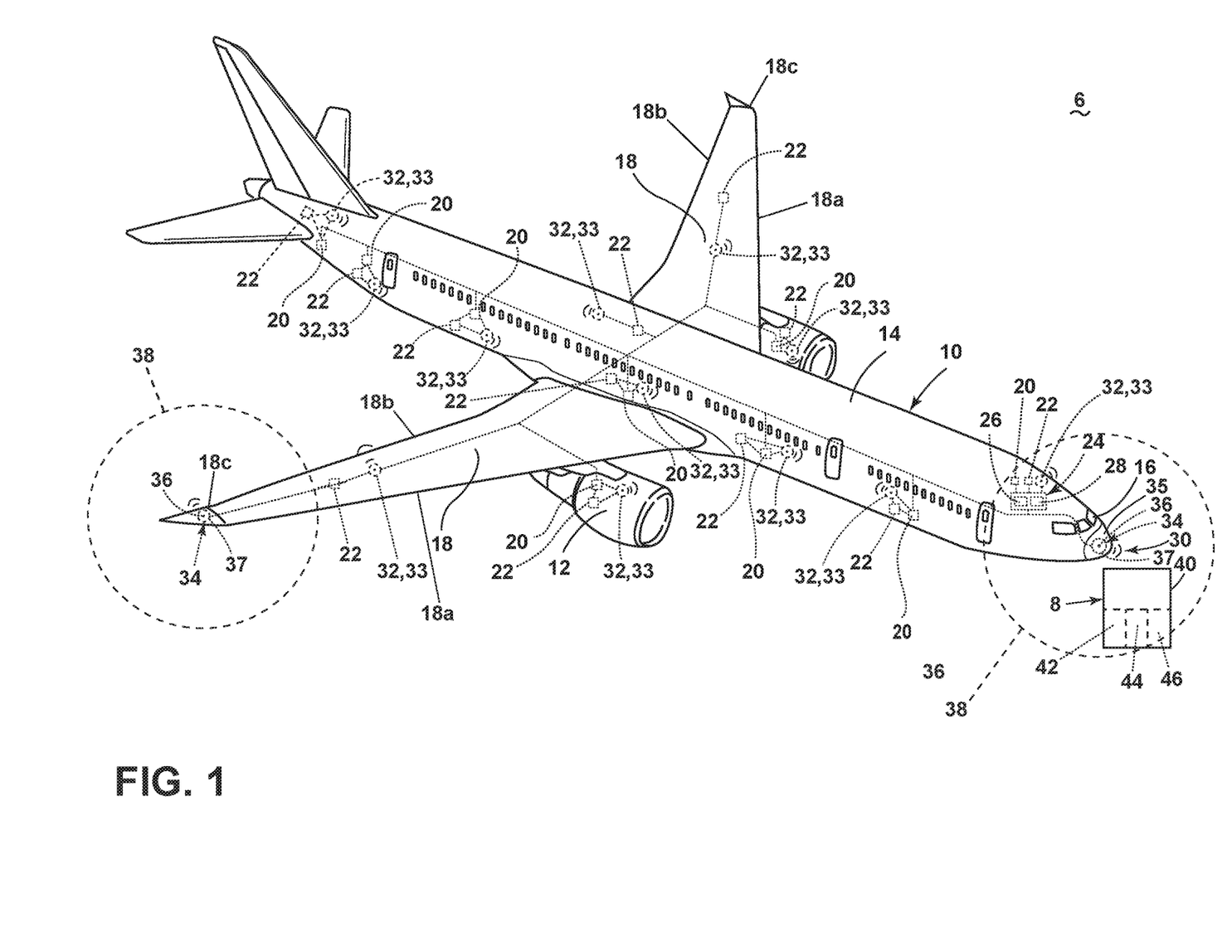
FIG. 1 is a schematic illustration of an aircraft system according to aspects of the present disclosure as described herein.

FIG. 1 schematically depicts an aircraft system 6 including a detector assembly 8 and an aircraft 10. The aircraft system 6 can include an asset tracking system or an aircraft monitoring system. One or more propulsion engines 12 coupled to a fuselage 14 can be included in the aircraft 10. A cockpit 16 can be positioned in the fuselage 14 and wing assemblies 18 can extend outward from the fuselage 14. The wing assemblies 18 can include a leading edge 18a, a trailing edge 18b, and a wingtip 18c defined there between.

While a commercial aircraft has been illustrated, it is contemplated that the aircraft system 6 can be used with any type of aircraft, for example, without limitation, fixed-wing, rotating-wing, rocket, space craft, helicopter, personal aircraft, flying taxis, and military aircraft. Further, while two propulsion engines 12 have been illustrated as gas turbine propulsion engines 12 and have been illustrated on the wing assemblies 18, it will be understood that any number or type of propulsion engines 12 have been contemplated.

At least one data system 20, which can aid in enabling proper operation of the aircraft 10 can be included in the aircraft 10. It will be understood that the data system 20 can be located within the fuselage 14, wing assemblies 18, or any other suitable portion of the aircraft 10. The data system 20 can include but is not limited to: an electrical system, an oxygen system, hydraulics and/or pneumatics system, a fuel system, a propulsion system, navigation systems, flight controls, audio/video systems, an Integrated Vehicle Health Management (IVHM) system. It should be understood that the data system 20 can include components associated with the mechanical structure of the aircraft 10 including flaps. A variety of aircraft data system(s) 20 have been illustrated for exemplary purposes and it will be understood that they are only a few of the systems and components that may be included in the aircraft 10.

At least one component 22, by way of non-limiting example, a component can be operably coupled to the at least one data system 20. The component(s) 22 can be, but are not limited to one or more of a temperature sensor, a humidity sensor, a vibration sensor, an accelerometer, a pressure sensor, a sonic or acoustic sensor, an optical sensor, a magnetic or electric field detector, a structural strain detector, an environmental sensor, a control system detector, a fuselage structure detector, a wing structure detector, an engine monitor, an altimeter, an asset tag, or a landing gear monitor. In this manner, a sensor can receive an input and provide an output related to, in non-limiting examples, temperature, altitude, pressure, magnetic fields, electric fields, humidity, vibration, speed, acoustical waves, or environmental measurements. By way of further non-limiting examples, the asset tag can include a system on a chip (SoC) that stores the health information of the aircraft 10 or asset.

Additionally or alternatively, the component(s) 22 can include one or more actuator(s). The one or more actuator(s) can provide an output signal related to a position or state of a portion of the one or more actuator(s). The output can be related to the portion of the actuator being open, closed, partially open, on, off, contacting, not contacting, partially contacting, or any other known output signal provided by actuators. Further still, while one component 22 has been illustrated as being associated with each data system 20 it will be understood that any number of component(s) 22 such as, but not limited to, multiple sensors or actuators, can be associated with each data system 20.

One or more computers or controllers 24, can be operably coupled to the at least one data system 20 to control their operation. While only a single controller 24 has been illustrated, it is contemplated that any number of controllers 24 can be included in the aircraft 10. In such an instance, the controller 24 can also be connected with other controllers of the aircraft 10. The controller 24 can include or be associated with any suitable number of individual microprocessors, power supplies, storage devices, interface cards, auto flight systems, flight management computers, and other standard components. For example, the controller 24 can include memory 26, the memory 26 can include random access memory (RAM), read-only memory (ROM), flash memory, or one or more different types of portable electronic memory, such as discs, DVDs, CD-ROMs, etc., or any suitable combination of these types of memory. The controller 24 can also include one or more processors 28, which can be running any suitable programs. The controller 24 can include or cooperate with any number of software programs or instructions designed to carry out the various methods, process tasks, calculations, and control/display functions necessary for operation of the aircraft 10. Further still, each of the data system(s) 20 can include their own processor. The data system(s) 20 can be communicatively coupled via wired or wireless to the controller(s) 24.

The controller 24 can also be communicably coupled to the at least one wireless central node 34 to transfer data to and from the aircraft 10. Additionally, the controller 24 can include a communication management module or be operably coupled to a communication module to provide an alert regarding the intrusion on a component and/or system of the aircraft. It is contemplated that a communication link 46 can be an additional wireless communication link to the at least one wireless central node 34. The communication link 46 can be any variety of communication mechanism capable of wirelessly linking with other systems and devices and can include, but is not limited to, packet radio, satellite uplink, Wireless Fidelity (WiFi), WiMax, Bluetooth, ZigBee, 3G wireless signal, code division multiple access (CDMA) wireless signal, global system for mobile communication (GSM), 4G wireless signal, long term evolution (LTE) signal, Ethernet, or any combinations thereof. It will also be understood that the particular type or mode of wireless communication of the communication link 46 is not critical to embodiments of this invention, and later-developed wireless networks are certainly contemplated as within the scope of embodiments of the invention. Further, the communication link 46 can include one or more radios including voice, aircraft communications addressing and reporting system (ACARS) analog, ACARS-digital, satellite communication (SATCOM), Cellular, etc. The communication link 46 can allow for communication with ground controllers or airlines operations center.

In the illustrated example, a communications network on the aircraft 10 includes a wireless network 30. The wireless network 30 can include a plurality of wireless remote nodes 32 fixedly located within the fuselage 14 and wing assemblies 18. The plurality of wireless remote nodes 32 can be operably coupled to the component(s) 22, which are in turn operably coupled to the data system(s) 20. The plurality of wireless remote nodes 32 are communicatively coupled to each other and at least one of the plurality of wireless remote nodes 32 define a wireless central node 34. The plurality of wireless remote nodes 32 can operate as at least one wireless central node 34, a central-peripheral switch node, or a peripheral node.

Data can be collected, processed, relayed, or transmitted by the data system(s) 20, the component(s) 22, or the controller 24 via the plurality of wireless remote nodes 32 to the at least one wireless central node 34. Data can include, but is not limited to, numerical values, rank, status, activation, deactivation, position, detection, or flight history information.

The plurality of wireless remote nodes 32 that are central-peripheral switch nodes can operate as the wireless central node 34 that gathers and communications data. Alternatively, the plurality of wireless remote nodes 32 that are central-peripheral switch nodes can operate as peripheral nodes, where the peripheral node provides information or data to the wireless central node 34.

It is contemplated that the location of the at least one wireless central node 34 can be indicated on an exterior 35 of the aircraft 10 using a symbol 37. By way of non-limiting example, at least one wireless central node 34 can be located at the wingtip 18c or the cockpit 16. It is further contemplated that the location of the plurality of wireless remote nodes 32 operating as central-peripheral switch nodes can be indicated on the exterior 35. Additionally or alternatively, the location of the central-peripheral switch nodes is known by accessing one or more databases using the model or other identifying properties of the aircraft 10. It is yet further contemplated that the location of the at least one wireless central node 34 or the plurality of wireless remote nodes 32 operating as central-peripheral switch nodes can be fixed or removable. Alternatively, at least one of the plurality of wireless remote nodes 32 operating as central-peripheral switch nodes can be located on the exterior 35 of the aircraft 10.

A wireless access point 36 can be defined by the at least one wireless central node 34. The wireless access point 36 is located in the aircraft 10 and can define a boundary 38 of the wireless network 30. The at least one wireless central node 34 can be configured to transmit data to the detector assembly 8. The data transmitted from the at least one wireless central node 34 to the detector assembly 8 can include the data provided to the at least one wireless central node 34 by the plurality of wireless remote nodes 32.

Figure 2:
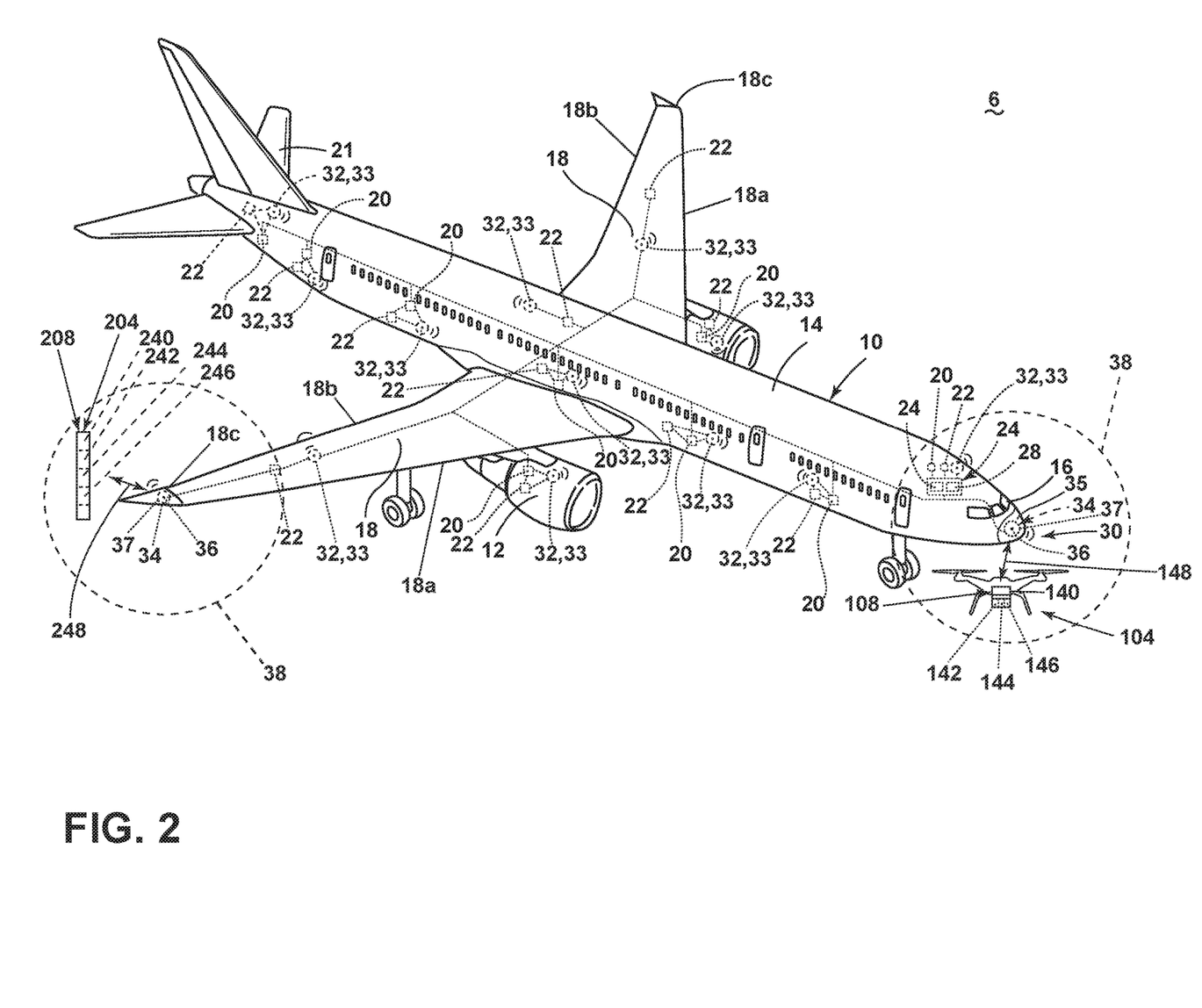
FIG. 2 is a schematic illustration of various detectors of the aircraft system from FIG. 1.

The boundary 38 as illustrated in FIG. 1 and FIG. 2 is not intended to indicate the relative size of the boundary 38. The illustration is to be understood that there is a limited region that can be identified within the boundary 38 for which the signal provided by the wireless access point 36 of the wireless network 30 can be used for communication.

A receiver 40 included in the detector assembly 8 can be configured for at least one-way communication of data from the at least one wireless central node 34 on the aircraft 10. It is contemplated that the receiver 40 is a transceiver capable of two-way communication between the at least one wireless central node 34 and the detector assembly 8. It is further contemplated that the receiver 40 can be a Bluetooth 4 or a Bluetooth 5 data collector.

The detector assembly 8 further includes at least one of a memory 42, a controller 44, or a communication link 46 that are operably coupled to the receiver 40.

FIG. 2 illustrates an unmanned aerial vehicle (UAV) 104 as a non-limiting example of a vehicle that can carry or otherwise house a detector assembly 108. The UAV 104 is a small UAV such as, but not limited to, commercial drones. The detector assembly 108 is substantially similar to the detector assembly 8. Therefore, like parts will be identified with like numerals increased by 100, with it being understood that the description of the like parts of the detector assembly 8 applies to the detector assembly 108 unless otherwise noted.

The UAV 104 can enter the boundary 38 of the wireless access point 36 defined by the at least one wireless central node 34. As illustrated, by way of non-limiting example, the UAV 104 enters the boundary 38 near the cockpit 16 of the aircraft 10. The UAV 104 can be deployed and controlled automatically. The deployment of the UAV 104 can be initiated by optional additional sensors detecting the presence of or aspects of the aircraft 10. By way of non-limiting example, the aircraft 10 can be detected at a terminal or ground station via an optical, weight, or speed. It is further contemplated that the optional additional sensors can identify or access a database to identify the model of the aircraft 10 and based on model, the UAV 104 will then be able to appropriate position itself to be within the boundary 38 to communicate with the at least one wireless central node 34.

Alternatively, the UAV 104 can be manually deployed and controlled. For example, an authorized individual user can deploy and control the UAV 104 into the boundary 38 to establish a single communication channel 148 with the at least one wireless central node 34. Optionally the symbol 37 on the exterior 35 of the aircraft 10 can be used as a visual indicator to help the authorized individual user control the UAV 104 into the boundary 38.

It is further contemplated that the deployment or the control of the UAV 104 can include both automatic and manual portions.

The communication channel 148 can be establish between the UAV 104 and the at least one wireless central node 34 when the UAV 104 is within the boundary 38. By way of non-limiting example, a controller 144 can initiate a receiver 140 on the UAV 104 to establish the communication channel 148 by first sending an identification signal to the at least one wireless central node 34 that activates the at least one wireless central node 34 and authenticates the UAV 104 as an approved communication device. The at least one wireless central node 34 can transmit data via the communication channel 148 to the receiver 140 of the UAV 104 that can be stored in a memory 142. The data transferred from the aircraft 10 to the UAV 104 can be completed by the communication channel 148. It is contemplated that no transfer of data from the at least one wireless central node 34 occurs unless the at least one wireless central node 34 receives a signal that can be authenticated, for example, by the one or more computers or controllers 24 aboard the aircraft 10.

An airport outpost 204 is also illustrated in FIG. 2 that is a non-limiting example of a structure that can include a detector assembly 208. The detector assembly 208 is substantially similar to the detector assembly 8. Therefore, like parts will be identified with like numerals increased by 200, with it being understood that the description of the like parts of the detector assembly 8 applies to the detector assembly 208 unless otherwise noted.

The aircraft 10 can be positioned so that the airport outpost 204 enters the boundary 38 of the wireless access point 36 defined by the at least one wireless central node 34. As illustrated, by way of non-limiting example, the airport outpost 204 enters the boundary 38 near the wingtip 18c of the aircraft 10. The airport outpost 204 can establish a communication channel 248 with the at least one wireless central node 34. By way of non-limiting example, a controller 244 can initiate a receiver 240 included in the airport outpost 204 to establish the communication channel 248 by first sending an identification signal to the at least one wireless central node 34 that activates the at least one wireless central node 34 and authenticates the airport outpost 204 as an approved communication device. The at least one wireless central node 34 can transmit data via the communication channel 248 to the receiver 240 of the airport outpost 204 that can be stored in a memory 242. The data transferred from the aircraft 10 to the airport outpost 204 can be completed by the single communication channel 248. It is contemplated that no transfer of data from the at least one wireless central node 34 occurs unless the at least one wireless central node 34 receives a signal that can be authenticated, for example, by the one or more computers or controllers 24 aboard the aircraft 10 to form the communication channel 248.

The airport outpost 204 can be located at, but not limited to, a runway, landing strip, terminal, or gate. It is contemplated that the airport outpost 104 can be integrated into any airport building or structure.

Alternatively, the detector assembly 8, 108, 208 can be brought into the boundary 38 using any manually or remotely movable vehicle or stationary structure. Additional non-limiting examples of vehicles can include a fuel truck, a baggage cart, or a trained animal, such as, but no limited to a dog. Additional non-limiting examples of structures can include structures beneath the runway or within the jet way. Additionally, it is contemplated that the aircraft 10 can communicate with the detector assembly 8, 108, 208 during flight or while on the ground as illustrated in FIG. 1 and FIG. 2 respectively.

Figure 3:
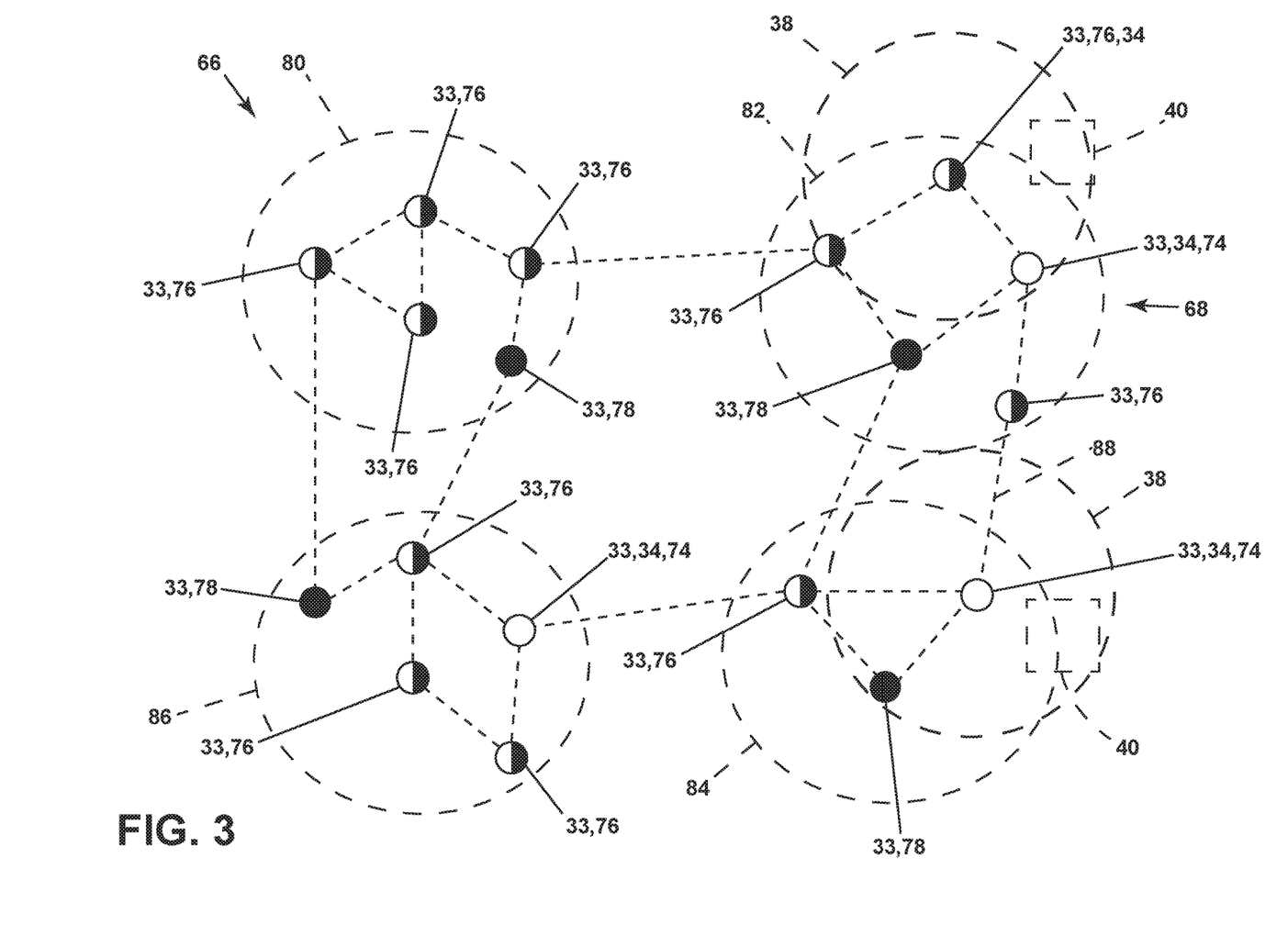
FIG. 3 is a schematic illustration of a plurality of wireless remote nodes of the aircraft system from FIG. 1.

The plurality of wireless remote nodes 32 can establish a Bluetooth low energy mesh 66, as illustrated by way of non-limiting example in FIG. 3. The Bluetooth low energy mesh 66 enables multiple devices to securely communicate (many-to-many communication) with one another over Bluetooth radio. The Bluetooth low energy mesh 66 offers a low energy aspect. The low energy aspect is a result of communication elements of the Bluetooth low energy mesh 66 remaining in sleep mode except when a connection is initiated. The communication elements can include any device that is Bluetooth enabled; including Bluetooth low energy mesh networking nodes 68. The actual connection times between communication elements can be very short, further reducing energy consumption. By way of non-limiting example, the connection times in which the communication elements are active can be a few milliseconds. Short connections can be obtained through a high rate of data transfer, such as, but not limited to approximately 1 Megabyte per second or more.

The Bluetooth low energy mesh networking nodes 68 can include a Bluetooth central node 74, a Bluetooth central-peripheral switch node 76, or a Bluetooth peripheral node 78. The Bluetooth peripheral node 78 acts as a slave and supplies information to the Bluetooth central node 74. The Bluetooth central node 74 usually acts as the central node 34 for transferring collected data 60 to the receiver 40 within the boundary 38 formed by the Bluetooth central node 74. It is contemplated that the receiver 40 can be a Bluetooth 4 or a Bluetooth 5 data collector configured to collect data from the Bluetooth central node 74.

The Bluetooth central-peripheral switch node 76 can switch between acting as the central node 34 (or Bluetooth central node 74) or the Bluetooth peripheral node 78. The inclusion of the Bluetooth central-peripheral switch nodes 76 in the Bluetooth low energy mesh 66 extends the range of the network. Additionally, the Bluetooth central-peripheral switch node 76 can transfer the collected data 60 to the receiver 40 within the boundary 38 when the formed the Bluetooth central-peripheral switch node 76 is provisioned to act as the central node 34.

By way of non-limiting example, the Bluetooth low energy mesh networking nodes 33 can be grouped into separate Bluetooth network clusters. A first engine cluster 80 and a second engine cluster 82 can include the Bluetooth low energy mesh networking nodes 33 associated with the propulsion engines 12.

A fuselage cluster 84 can include the Bluetooth low energy mesh networking nodes 33 provisioned to gather information about the fuselage 14. Similarly, a tail cluster 86 can include the Bluetooth low energy mesh networking nodes 33 located within a certain range of a tail of the aircraft 10.

While the first engine cluster 80, the second engine cluster 82, the fuselage cluster 84, and the tail cluster 86 are illustrated, it is contemplated that any number of clusters can be established by the Bluetooth low energy mesh networking nodes 33.

The first engine cluster 80, the second engine cluster 82, the fuselage cluster 84, and the tail cluster 86 can communicate. By way of non-limiting example, communication is illustrated between the second engine cluster and the fuselage cluster 84 by a connecting line 88. The connecting line 88 illustrates the Bluetooth central-peripheral switch node 76 of the second engine cluster 82 communicating with the Bluetooth central node 74 of the fuselage cluster 84. Additional communication lines are also illustrated by way of non-limiting example. The communication between the clusters 80, 82, 84, or 86 forms and fully integrates the Bluetooth low energy mesh 66.

Figure 4:
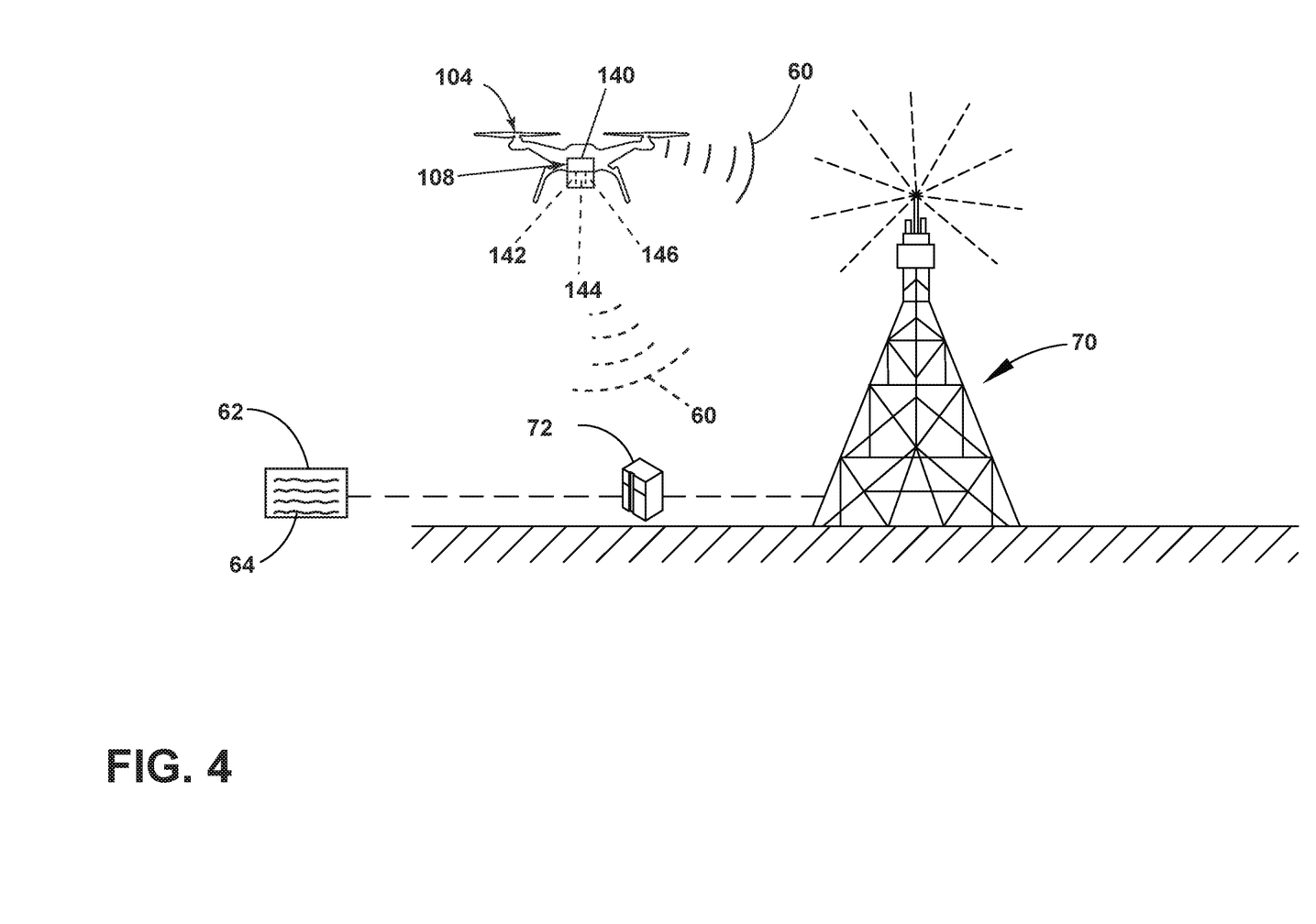
FIG. 4 is a schematic illustration of collected information communication within the aircraft system of FIG. 2.

FIG. 4 illustrates, by way of non-limiting example, a ground system 70 that can receive the collected data 60 obtained by the UAV 104 via the detector assembly 108. The communication link 146 can be used to transfer the collected data 60 or other information to the ground system 70. A destination server or computer 72 is also illustrated and can indirectly communicate via the ground system 70 and the UAV 104 with the aircraft 10. The computer 72 can be located at or in communication with the ground system 70. The ground system 70 can be any type of communicating ground system such as an airline operations center. Optionally, the collected data 60 can be communicated directly to the computer 72 via the detector assembly 108 of the UAV 104. It will be understood that such information may be securely communicated to the computer 72. The detector assembly 108 can execute a program for transmitting the collected data 60 from the detector assembly 108 to the computer 72. It is contemplated that such a process can be user initiated, implemented automatically by the detector assembly 108, or queried by the computer 72.

Once the collected data 60 is transferred or otherwise relayed to the computer 72 and the computer 72 can analyze the collected data 60 to determine a status of the one or more data system(s) 20 of the aircraft 10. The computer 72 can include any suitable computer processor or computer program product comprising machine-readable media for carrying or having machine-executable instructions or data structures stored thereon. A display 62 can be operably coupled to the computer 72 and the computer 72 can be configured to provide an indication or data output 64 to the display 62 that is representative of the collected data 60 or some portion thereof including a processed portion of the collected data 60. By way of non-limiting example, an indication or output could include a component or data system failure or maintenance or error code. It is contemplated that the indication or output can help maintenance, repair, and overhaul operations team identify a fault.

Figure 5:
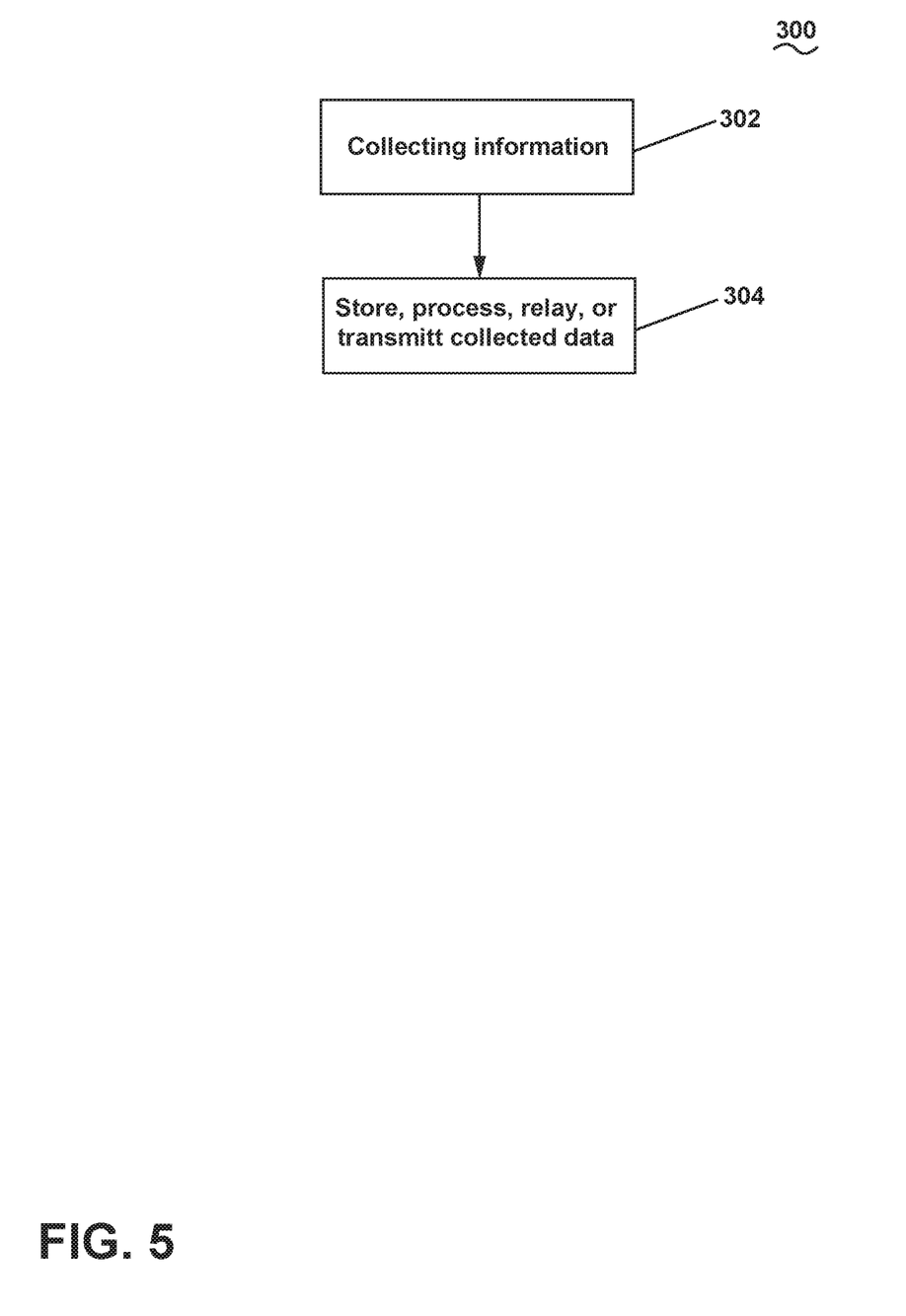
FIG. 5 is a flow chart diagram illustrating a method of collecting data in an aircraft that can be carried out at least in part by the aircraft system of FIG. 1 or FIG. 2.

FIG. 5 is a flow chart illustrating a method 300 for collecting data in the aircraft 10. The method includes collecting information at 302. Collecting information at 302 can include collecting information from the data system(s)

20. More specifically, the data system(s) 20 can obtain input from the component(s) 22 it is operably coupled thereto. The plurality of wireless remote nodes 32 can then collect the information from the component(s) 22 through direct communication with the component(s) 22 or via the data system (s) 20. The plurality of wireless remote nodes 32 can communicate the output from the at least one data system 20 or the component(s) via the wireless network 30 to the at least one wireless central node 34. The plurality of wireless remote nodes 32 can be the Bluetooth low energy mesh networking nodes 33. The output from the plurality of wireless remote nodes 32 or the Bluetooth low energy mesh networking nodes 33 can be collected by the at least one wireless central node 34 to define the collected data 60. The at least one wireless central node 34 can be a master Bluetooth node that further defines a Bluetooth access point within the aircraft 10. The Bluetooth access point can define the boundary 38 of a Bluetooth network. Additionally or alternatively, at least one of the outputs from the plurality of wireless remote nodes 32 or the Bluetooth low energy mesh networking nodes 33 can be collected by the controller 24 before being communicated to the at least one wireless central node 34 or the master Bluetooth node to define the collected data 60.

The receiver 40, 140, 240 of the detector assembly 8, 108, 208 can collect information at 302, such as the collected data 60, from the at least one wireless central node 34. Optionally, the receiver 40, 140, 240 can be a Bluetooth transceiver so that at 302, the collecting of information can be accomplished via the Bluetooth transceiver. It is contemplated that the Bluetooth transceiver is located at the airport outpost 204 such as a runway, landing strip, terminal, or gate. It is further contemplated that the Bluetooth transceiver can be carried by the UAV 104 or other remotely controlled or manually controlled vehicle.

Optionally, at 302, the receiver 40, 140, 240 that is a Bluetooth transceiver is a Bluetooth 4 or Bluetooth 5 data collector configured to collect data from the Bluetooth low energy mesh networking nodes 33 when the UAV 104 is proximate to the aircraft 10. By way of non-limiting example, when the UAV 104 is within the boundary 38.

When the UAV 104 is within the boundaries 38 and the collected data 60 is transmitted from the at least one wireless central node 34 to the receiver 140, at 304 the collected data 60 is stored in the memory 142, processed via the controller 144, or relayed via the communication link 146. Optionally, the communication link 146 can further transmit the collected data 60. It is considered that when the UAV 104 collects the information pertaining to the collected data 60, the UAV 104 at 304 can relay or transmit the collected data 60 to a ground system 70. Optionally, the collected data 60 can be further processed at the ground system 70. The processing can be completed using the destination server or computer 72 communicatively coupled to the ground system 70. The indication or data output 64 related to the processed data can be communicated using the display 62.

It is contemplated that if the initially designated primary wireless central node fails to communicate, is obstructed, or otherwise unable to perform its duty, that another wireless central node can become the primary wireless central node that gathers the outputs from plurality of wireless remote nodes 32 and communicates the data to a detector assembly 8, 108, 208. Therefore, it is contemplated that any number of nodes that can take the role as central node can be located in or on the aircraft 10.

In operation, by way of non-limiting example, a pilot can report the failure of an auxiliary power unit in the tail of the aircraft 10. When the aircraft 10 lands, the Bluetooth central nodes 74 or the Bluetooth central-peripheral nodes 76 will be sent an awake signal when, for example, weigh is detected by the wheels. Additionally or alternatively, the awake signal can be sent by recognition of an authorized signal from the UAV 104 or airport outpost 204. The UAV 104 can intentionally approach the aircraft 10 within the boundary 38 of one of the Bluetooth central node 74 or the Bluetooth central-peripheral node 76 in the tail cluster 86. If the Bluetooth central nodes 74 or the Bluetooth central-peripheral nodes 76 of the tail cluster 86 do not respond to a request of a response or become otherwise inaccessible, the detector assembly 108 can establish communication, for example, between the receiver 140 and the Bluetooth central node 74 or the Bluetooth central-peripheral node 76 acting as the central node 34 of the second engine cluster 82. Information from the tail cluster 86 can then be communicated, for example, via the connecting line 88 to the second engine cluster 82, then to the UAV 104. The UAV 104 can then obtain the collected data 60 corresponding to at least the auxiliary power. Additionally, or alternatively, all collected data 60 related to the at least one data system 20 or the at least one component 22 can be communicated from the Bluetooth low energy mesh 66 to the UAV 104.

Once the collected data 60 is obtained by the UAV 104, it can quickly forward to the maintenance team for further actions. The collected data 60 can be processed using the controller 144 or processed after being communicated to the ground system 70 by the destination server or computer 72. The quick communication of the collected data 60 obtained before the aircraft 10 reaches the gate can significantly reduce the time involved in maintenance.

Aspects of the present disclosure provide for a variety of benefits including providing an efficient asset performance management tracking system that is configured to track components and systems in real-time. A technical effect of aspects of the present disclosure reduce a down time of an aircraft by speeding up the maintenance routine by providing efficient and effective manner for transferring data related to components and systems. Another benefit that can be realized includes the weight reduction found in utilizing a wireless sensor networking with non-wired connections. Further still such a Bluetooth mesh offers multi-level security with all communications authenticated, encrypted, and obfuscated wherein the data is not easily intercepted unlike current Wi-Fi datalink nodes. Further still the Bluetooth mesh has lower energy consumption than wired & Wi-Fi nodes.

Yet another benefit that can be realized when compared to the current method using radio-frequency identification (RFID) tags. In order to obtain data using RFID tags, each tag must be scanned. Therefore an individual or vehicle must circumvent the entire aircraft. Using the structure or method of the present disclosure, data is obtained from a single location. If the single location is obstructed, due to the nature of a mesh network, a second single point can be activated and used to transfer data. This also allows for nodes in the present disclosure to be located in inaccessible regions within the fuselage.

The advantage of the Bluetooth low energy mesh network is the ability of the receiver (Bluetooth 5 data collector) to connect to any central node or central-peripheral switch nodes in the Bluetooth low energy mesh to get the collected data. The decentralized architecture allows the receiver to approach the aircraft using a variety of different routes. No longer restricted by having a single central node, the receiver can travel the best route (based on power consumption, bandwidth, speed, etc) to connect with one or more central or central-peripheral nodes across different zones of the aircraft.

Still yet another benefit of the present disclosure is that information from the aircraft 10 can be obtained sooner thereby reducing any flight down time. For example, the information can be collected while landing or immediately after landing by a properly positioned airport outpost. Alternatively, the UAV or automated devices can obtain information from the wireless central node prior to the aircraft landing or immediately following landing without the aircraft going to a gate.

To the extent not already described, the different features and structures of the various embodiments can be used in combination with each other as desired. That one feature is not illustrated in all of the embodiments is not meant to be construed that it cannot be, but is done for brevity of description. Thus, the various features of the different aspects can be mixed and matched as desired to form new aspects, whether or not those are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aircraft system, comprising:
    an aircraft, comprising:
        at least one data system located within the aircraft and configured to aid in operation of the aircraft;
        at least one component operably coupled with the at least one data system and providing an output related thereto; and
        a wireless network including a plurality of wireless remote nodes located within the aircraft and operably coupled to the at least one component to receive the output therefrom the plurality of wireless remote nodes communicatively coupled to each other, the plurality of wireless remote nodes, comprising:
            a primary wireless central node that defines a wireless access point located in the aircraft and boundaries of the wireless network, wherein the primary wireless central node is configured to gather the output of a set of the plurality of wireless remote nodes as collected data and transmit the collected data therein; and
            at least one central-peripheral switch node included in the set of the plurality of wireless remote nodes wherein when the primary wireless central node is operable, the primary wireless central node is configured to gather the output of the set of the plurality of wireless remote nodes that includes the at least one central-peripheral switch node, as collected data and transmit the collected data therein and wherein when the primary wireless central node is not operable the at least one central-peripheral switch node defines a wireless access point located in the aircraft and the at least one central-peripheral switch node is configured to gather the output of a remainder of the set of the plurality of wireless remote nodes as collected data and transmit the collected data therein; and
    a detector assembly, comprising:
        a receiver configured for at least one-way communication of the collected data from the primary wireless central node or the at least one central-peripheral switch node on the aircraft; and
        at least one of a memory, a controller, or a communication link operably coupled to the receiver;
        wherein when the detector assembly is within the boundaries, the collected data transmitted from the primary wireless central node or the at least one central-peripheral switch node is received by the receiver and at least one of stored in the memory, processed via the controller, or relayed via the communication link.

2. The aircraft system of claim 1 wherein the plurality of wireless remote nodes are Bluetooth low energy mesh networking nodes.

3. The aircraft system of claim 2 wherein at least one of the Bluetooth low energy mesh networking nodes is inaccessible within the aircraft.

4. The aircraft system of claim 3 wherein the receiver is a Bluetooth 5 data collector configured to obtain the collect data from the Bluetooth low energy mesh networking nodes when an unmanned aerial vehicle is proximate to the aircraft.

5. The aircraft system of claim 4 wherein the receiver is a transceiver configured for two-way communication.

6. The aircraft system of claim 4, further comprising an airport outpost and wherein the communication link transmits the collected data to the airport outpost.

7. The aircraft system of claim 1 wherein the detector assembly is carried by an unmanned aerial vehicle.

8. The aircraft system of claim 1 wherein a predetermined location of the primary wireless central node or the central-peripheral switch node is identified on an exterior of the aircraft.

9. The aircraft system of claim 1 wherein the detector assembly is located at an airport outpost.

10. The aircraft system of claim 1 wherein the receiver and the primary wireless central node or the central-peripheral switch node operating as a wireless central node are configured for two-way communication.

11. A method of collecting data in an aircraft, comprising:
    collecting information from a primary wireless central node when the primary wireless central node is operable, wherein the primary wireless central node is configured to gather the output of a set of a plurality of wireless remote nodes that includes at least one central-peripheral switch node, as collected data and, when the primary wireless central node is not operable, collecting information from the at least one central-peripheral switch node operating as a wireless central node configured to gather the output of a remainder of the plurality of wireless remote nodes, as collected data, wherein at least one data system configured to aid in operation of the aircraft includes at least one component operably coupled and providing an output related thereto via the primary wireless central node, the at least one central-peripheral switch node, or the plurality of wireless remote nodes located within the aircraft; and at least one of storing the collected data, processing the collected data, relaying the collected data, or transmitting the collected data.

12. The method of claim 11 wherein the collecting information is accomplished via a Bluetooth transceiver.

13. The method of claim 12 wherein the plurality of wireless remote nodes are Bluetooth low energy mesh networking nodes.

14. The method of claim 13 wherein the Bluetooth transceiver is carried by an unmanned aerial vehicle.

15. The method of claim 14 wherein the Bluetooth transceiver is a Bluetooth 5 data collector configured to collect data from the Bluetooth low energy mesh networking nodes when the unmanned aerial vehicle is proximate to the aircraft.

16. The method of claim 14 wherein the collected information is at least one of relayed or transmitted to a ground system.

17. The method of claim 16, further comprising processing the collected data at the ground system and providing an indication on a display related to processed data.

18. The method of claim 12 wherein the Bluetooth transceiver is located at an airport outpost.

19. An aircraft, comprising:
at least one data system associated with the aircraft and configured to aid in operation of the aircraft;
at least one component operably coupled with the at least one data system and providing an output related thereto; and
a Bluetooth network including a plurality of Bluetooth low energy mesh networking nodes located within a portion of the aircraft and operably coupled to the at least one component to receive the output therefrom, the plurality of Bluetooth low energy mesh networking nodes comprising:
a primary wireless central node operably coupled to a set of the plurality of Bluetooth low energy mesh networking nodes and communicatively coupled thereto and defining a Bluetooth access point located in the aircraft that defines boundaries of the Bluetooth network; and
a plurality of central-peripheral switch nodes included in the set of the plurality of Bluetooth low energy mesh networking nodes;
wherein when the primary wireless central node is operable, the primary wireless central node is configured to gather the output of the set of the plurality of Bluetooth low energy mesh networking nodes that includes the plurality of central-peripheral switch nodes as collected data and transmit data therein, and wherein, upon provision or a communication failure, fault, or obstruction of the primary wireless central node, any one or more of the plurality of central-peripheral switch nodes is configured to define a corresponding Bluetooth access point located in the aircraft, gather the output of a remainder of the plurality of Bluetooth low energy mesh networking nodes as collected data, and transmit the collected data within the boundaries of the Bluetooth network.

20. The aircraft of claim 19 wherein the primary wireless central node or at least one of the plurality of central-peripheral switch nodes is configured to transmit the collected data to a detector assembly when the detector assembly is within the boundaries of the Bluetooth network.

21. The aircraft of claim 20 wherein the detector assembly is located outside of the aircraft.

22. The aircraft of claim 21 wherein the detector assembly is carried by an unmanned aerial vehicle or coupled to a ground station.

23. The aircraft system of claim 1 wherein the plurality of wireless remote nodes includes the primary wireless central node and the remainder of the plurality of wireless remote nodes are central-peripheral switch nodes.

24. The aircraft system of claim 1 wherein the plurality of wireless remote nodes includes the primary wireless central node and a plurality of central-peripheral switch nodes wherein upon provision or a communication failure, fault, or obstruction of the primary wireless central node, any one or more of the plurality of central-peripheral switch nodes defines a corresponding wireless access point located in the aircraft configured to gather the output of the remainder of the set of the plurality of wireless remote nodes as the collected data.

* * * * *